United States Patent
Schwantner

(10) Patent No.: US 9,371,036 B2
(45) Date of Patent: Jun. 21, 2016

(54) DISPLAY DEVICE OF A MOTOR VEHICLE AND METHOD FOR OPERATING A DISPLAY DEVICE OF THIS TYPE

(71) Applicant: AUDI AG, Ingolstadt (DE)

(72) Inventor: Stephan Schwantner, Haunstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/415,943

(22) PCT Filed: Jul. 10, 2013

(86) PCT No.: PCT/EP2013/002028
§ 371 (c)(1),
(2) Date: Jan. 20, 2015

(87) PCT Pub. No.: WO2014/012635
PCT Pub. Date: Jan. 23, 2014

(65) Prior Publication Data
US 2015/0210212 A1    Jul. 30, 2015

(30) Foreign Application Priority Data
Jul. 20, 2012   (DE) .................. 10 2012 014 352

(51) Int. Cl.
*B60Q 3/04*       (2006.01)
*B60K 37/02*      (2006.01)
(Continued)

(52) U.S. Cl.
CPC ............. *B60Q 3/048* (2013.01); *B60K 35/00* (2013.01); *B60K 37/02* (2013.01); *G01D 11/28* (2013.01);
(Continued)

(58) Field of Classification Search
CPC ............ G09G 3/006; G09G 2360/144; G09G 2360/145; G01J 1/0425
See application file for complete search history.

(56) References Cited

U.S. PATENT DOCUMENTS 6,950,098 B2   9/2005   Brabander et al.
8,816,833 B2   8/2014   Tominaga
(Continued)

FOREIGN PATENT DOCUMENTS

DE    32 45 299 A1    6/1984
DE    41 29 846 A1    3/1993
(Continued)

OTHER PUBLICATIONS

Office Action mailed May 10, 2013 for corresponding German Patent Application No. 10 2012 014 352.4.
(Continued)

*Primary Examiner* — Quan-Zhen Wang
*Assistant Examiner* — Xuemei Zheng
(74) *Attorney, Agent, or Firm* — Staas & Halsey LLP

(57) ABSTRACT

A display device of a motor vehicle has a display element, by which a value can be displayed by transmitting light beams through the display element and which can be adjusted in its display brightness. A detection device includes a control unit and a detecting element for detecting an ambient brightness of the surroundings of the display element. The display brightness can be adjusted by the control unit depending on a signal characterizing the detected ambient brightness and transmitted from the detecting element to the control unit. The detecting element is designed to detect light beams transmitted by the display element and to transmit an evaluation signal characterizing the detected light beams to the control unit, by which the display element can be tested regarding its functionality depending on the evaluation signal. A related method is used to operate the display device.

16 Claims, 3 Drawing Sheets

(51) Int. Cl.
*B60K 35/00* (2006.01)
*G09G 3/00* (2006.01)
*G09G 3/36* (2006.01)
*G01D 11/28* (2006.01)
*H05B 37/02* (2006.01)
*G02F 1/13* (2006.01)
*G01D 18/00* (2006.01)

(52) U.S. Cl.
CPC ............ *G09G 3/006* (2013.01); *G09G 3/36* (2013.01); *H05B 37/0218* (2013.01); *B60K 2350/00* (2013.01); *B60K 2350/1064* (2013.01); *B60K 2350/203* (2013.01); *B60K 2350/2069* (2013.01); *G01D 18/00* (2013.01); *G02F 1/1309* (2013.01); *G02F 2201/58* (2013.01); *G02F 2203/69* (2013.01); *G09G 2320/029* (2013.01); *G09G 2320/064* (2013.01); *G09G 2320/0626* (2013.01); *G09G 2330/12* (2013.01); *G09G 2360/144* (2013.01); *G09G 2360/145* (2013.01); *G09G 2380/10* (2013.01); *Y02B 20/46* (2013.01)

(56) References Cited

U.S. PATENT DOCUMENTS

| 9,058,769 | B2* | 6/2015 | Bert | G09G 3/3208 |
| 9,099,042 | B2* | 8/2015 | Sugiyama | G09G 3/3406 |
| 2007/0279369 | A1 | 12/2007 | Yao et al. | |
| 2011/0242074 | A1* | 10/2011 | Bert | G09G 3/3208 345/207 |
| 2012/0217969 | A1* | 8/2012 | Cao | G01R 31/2635 324/414 |
| 2013/0063471 | A1* | 3/2013 | Sugiyama | G09G 3/3406 345/589 |
| 2015/0210212 | A1* | 7/2015 | Schwantner | B60K 37/02 345/207 |

FOREIGN PATENT DOCUMENTS

| DE | 101 00 214 A1 | 7/2001 |
| DE | 101 60 296 A1 | 6/2003 |
| DE | 103 41 622 B3 | 8/2005 |
| DE | 601 32 662 T2 | 2/2009 |
| DE | 10 2007 042 720 A1 | 3/2009 |
| DE | 10 2009 036 316 A1 | 2/2010 |
| DE | 10 2012 014 352.4 | 7/2012 |
| EP | 2 034 352 A2 | 3/2009 |
| EP | 2 293 284 A1 | 3/2011 |
| JP | 2002-71395 | 3/2002 |
| WO | WO 2005/025921 A1 | 3/2005 |
| WO | WO 2007/069107 A2 | 6/2007 |
| WO | PCT/EP2013/002028 | 7/2013 |

OTHER PUBLICATIONS

International Search Report mailed Apr. 16, 2014 for corresponding International Patent Application No. PCT/EP2013/002028.
WIPO English Language Translation of International Preliminary Report on Patentability for PCT/EP2013/002028, 6 pages, downloaded from WIPO website Jan. 20, 2015.

* cited by examiner

DISPLAY DEVICE OF A MOTOR VEHICLE AND METHOD FOR OPERATING A DISPLAY DEVICE OF THIS TYPE

CROSS REFERENCE TO RELATED APPLICATIONS

This application is based on and hereby claims priority to International Application No. PCT/EP2013/002028 filed on Jul. 10, 2013 and German Application No. 10 2012 014 352.4 filed on Jul. 20, 2012, the contents of which are hereby incorporated by reference.

BACKGROUND

The invention relates to a display device of a motor vehicle and a method for operating such a display device.

Such display devices of motor vehicles and methods for operating such display devices are well known from the series production of motor vehicles, especially automobiles. FIG. 1 shows such a display device 10 according to the prior art in a schematic front view. The display device 10 is commonly also referred to as a combination instrument and is used in automobiles of the AUDI brand.

The display device 10 comprises a first display element 12 in the form of a so-called tachometer, by which values of a revolution rate of an internal combustion engine for driving the automobile can be displayed. For this the display element 12 comprises a scale of values 14 with the values for the revolution rate and a pointer 18 pivotable about a pivot axis 16 along the scale of values 14. The pointer 18 indicates the current value of the revolution rate. In the present case the internal combustion engine is turned off, so that the value of the revolution rate is 0.

The display device 10 comprises a second display element 20 in the form of a so-called speedometer, by which values of a vehicle speed of the automobile can be displayed. For this purpose the display element 20 comprises a scale of values 22 with values of the vehicle speed and a pointer 26 pivotable about a pivot axis 24 along the scale of values 22. The current value of the vehicle speed can be displayed by the pointer 26. In the present case the automobile is stationary, so that the value of the vehicle speed is 0.

The display device 10 also comprises a third display element 28 for displaying values characterizing a fill level of a fuel tank of the automobile. Moreover, a fourth display element 30 for displaying values of a temperature of a liquid coolant or a temperature of a lubricant is provided.

Furthermore, the display device 10 comprises a fifth display element 32 that is in the form of a liquid crystal display screen for displaying different values. One of said values is the current time of day 34 in the present case. Another of said values is a range 36 over which the automobile can still be driven by the internal combustion engine using an amount of fuel remaining in the fuel tank.

The display of the respective values by the display elements 12, 20, 28, 30, 32 takes place here by transmitting light beams through the respective display element 12, 20, 28, 30, 32. This means for example that the liquid crystal display screen (display element 32) transmits light beams in order to display the current time of day 34 and the range 36. Each display element 12, 20, 28, 30, 32 comprises at least one illumination element for example for transmitting the corresponding light beams.

A relevant display brightness of the respective display elements 12, 20, 28, 30, 32 can be set in order to provide pleasant brightness conditions for the driver of the automobile. In the case of bright ambient conditions, for example a high display brightness is set, whereas in the case of comparatively dark ambient conditions a lower display brightness is set.

The display device 10 (combination instrument) also comprises a detection device that cannot be seen in FIG. 1 with a control unit and at least one detecting element 38 for detecting an ambient brightness of the surroundings of the display elements 12, 20, 28, 30, 32.

Within the scope of the method for operating the display device 10, the respective display brightness is adjusted by the control unit depending on at least one signal characterizing the detected ambient brightness and transmitted by the detecting element to the control unit. The detecting element 38 is for example a photodiode or a phototransistor.

The display device 10 also comprises another detecting element 40 that cannot be seen by the driver or other vehicle occupants in the passenger compartments of the automobile and that is only illustrated in FIG. 1 in order to enable a clear explanation of its function. The other detecting element 40 is used to test the functionality of the liquid crystal display screen (display element 32). The detecting element 40 is in the form of a phototransistor here for example.

The use of the additional detecting element 40 for testing the functionality of the display element 32 requires both additional costs of development and also of wiring and installation space.

A display instrument for a motor vehicle is also known from DE 103 41 622 B3. The display element comprises an optical fiber for detecting the ambient light with a sensor that is disposed on the optical fiber and, depending on the detected ambient light, outputs a control signal for controlling the brightness of the display element to an evaluation circuit. Furthermore, a display device with an optical fiber as known can be obtained from DE 101 60 296 A1, wherein the optical fiber is mounted in the display device. An ambient brightness can be measured by the optical fiber. The brightness of the display device can then be adjusted depending on the measured ambient brightness.

DE 32 45 299 A1 also discloses a display device in motor vehicles with control of the brightness of the display device depending on the light passing from the observation space to the display. Furthermore, moreover a photodetector for detecting the light density of the surroundings in the viewing direction of the driver is provided, which adjusts the brightness of the display device depending on the light density by a control circuit.

Such display devices are also known from JP 2002071395 A and from DE 10 2009 036 316 A1.

SUMMARY

It is one potential object to develop a display device and a method for operating such a display device of the above-mentioned type such that the display device has particularly low complexity.

The inventor proposes a display device of a motor vehicle, especially of an automobile, with at least one display element. At least one value, at least one graphic, at least one letter or similar can be displayed by the display element by transmitting light beams through the display element. The display element is thereby adjustable in its display brightness. The display device also comprises a detection device with a control unit and at least one detecting element for detecting an ambient brightness of the surroundings of the display element. The display brightness of the display element can be adjusted by the control unit depending on at least one signal characterizing the detected ambient brightness and transmitted from the detecting element to the control unit.

In order to keep the number of parts and thus the complexity and thus the costs and the weight of the display device particularly low, it is provided according to the proposal that the detecting element is configured to detect light beams transmitted by the display element and to transmit at least one evaluation signal characterizing the detected light beams to the control unit. The functionality of the display element can be tested by the control unit depending on the evaluation signal. This allows an additional detecting element for testing the functionality of the display element to be avoided. This is accompanied by the avoidance of additional wiring costs. Moreover, additional installation space does not have to be provided for the additional detecting element.

In the case of the proposed display device, functional integration is provided, as a result of which the detecting element has a dual function. On the one hand the detecting element carries out the task of detecting the ambient brightness so that the display brightness can be adjusted depending on the ambient brightness. On the other hand the detecting element is used to detect light beams transmitted by the display element and depending on the same to check the display element's functionality. In other words, using the detecting element a check can also be made as to whether at least one value and/or one graphic and/or text and/or similar can be displayed by the display element.

In an advantageous embodiment, at least one first optical fiber is provided, by which light beams from the surroundings can be fed to the detecting element. Furthermore, at least one second optical fiber is provided, by which the light beams transmitted by the display element can be fed to the detecting element.

In other words, the ambient brightness can be detected by the detecting element via the first optical fiber, while the light beams transmitted by the display element can be detected by the detecting element via the second optical fiber. For this purpose the light beams are passed from the surroundings to the detecting element via the first optical fiber. The second optical fiber is used to guide the light beams transmitted by the display element to the detecting element. By the use of optical fibers it is possible to detect the light beams from the surroundings and the light beams transmitted by the display element at respective, relatively widely spaced points, because the respective light beams can be guided from the separately disposed points to the one detecting element.

It is thus possible for example to avoid mutual influencing of the detection of the ambient brightness and the detection of the light beams transmitted by the display element, so that as a result incorrect variations of the display brightness and false indications about the functionality of the display element can be avoided. This results in a very high quality functionality of the display device, because both precise conclusions can be drawn about the ambient brightness and especially its variation and particularly precise or meaningful conclusions can be drawn about the functionality of the display element.

It has been shown to be particularly advantageous if the display element comprises a display surface by which light beams can be transmitted by the display element, wherein the display element is designed to radiate the light beams detectable by the detecting element in a sub region of the display surface. The whole display surface of the display element is not used, but only the sub region is used to test the functionality of the display element. This allows the transmission of the light beams by the display element, which is used to test the functionality of the display element, to be carried out independently of the display of a value by the display element for example.

In other words, the display for example of the value by the display element is not affected by the transmission of the light beams through the display element that are used to test the functionality of the display element. Moreover, the sub region can be particularly small and thus not visually noticeable, or only very slightly noticeable, by the driver of the automobile, while the entire display surface can be particularly large in order to be able to display at least one value and/or text and/or at least one graphic with good visibility thereof for the driver.

The display element is a liquid crystal display screen for example, wherein the sub region of the display surface from which the light beams that are used to test the functionality of the liquid crystal display screen are radiated comprises only a small number of image points of the liquid crystal display screen, so-called pixels.

By the detecting element it is possible for example to test the display element regarding its basic functionality, in general transmitting light beams and thus being able to display at least one value.

In a further embodiment it has been shown to be particularly advantageous if the control unit is designed to vary an intensity of the light beams that can be detected by the detecting element and transmitted by the display within a specifiable period of time. In other words, light and dark cycling of the display element is achieved by this, wherein the intensity of the light beams that can be detected by the detecting element and transmitted by the display is higher during a light phase of the light and dark cycling than during a dark phase of the light and dark cycling. This allows the display element to be tested especially as to whether a variation of the value or the graphic and/or the illustration of a different value or a different graphic is possible or not.

As a result of the light and dark cycling, the evaluation signal is modulated accordingly. If a variation or a change of the value or the graphic is no longer possible, then the light and dark cycling and the corresponding modulation of the evaluation signal are no longer possible. This is commonly referred to in the computer field as "freezing" or as "hanging" of the display element. If this is the case, then despite suitable activation of the display element by the control unit no alternating light and dark phases occur within the specifiable period of time, but only the light phase or the dark phase occurs during the specifiable period of time. As a result the evaluation signal is at least substantially constant, because the display element is constantly light or constantly dark at least in the sub region. As a result thereof, a malfunction of the display element can be concluded, so that for example suitable countermeasures can be initiated.

The display element can basically be still intact and able to transmit light beams in this case, but only a change of the value or the display is no longer possible. In order to enable such a change again, for example the display element can be briefly turned off and turned on again. If by contrast a complete defect of the display element is detected, so that the display element can no longer transmit light beams, then this can for example be stored in a fault memory and/or communicated to the driver by an indication signal.

A particularly precise and meaningful test of the display element regarding its functionality is especially provided if the control unit is designed to reduce the intensity to zero at least once within the specifiable period of time. In other words, in this case no light beams are radiated by the display element during the dark phase of the light and dark cycling. In this way a significant difference in the intensity of the light beams in comparison to the light phase can be effected, so that the light phase can be clearly distinguished from the dark phase.

A motor vehicle is also part, especially an automobile, with a proposed display device, wherein costs of the motor vehicle can be saved because of the use of the detecting element both for detecting the ambient brightness and also for testing the display element regarding its functionality.

The second aspect of the inventor's proposal relates to a method for operating a display device of a motor vehicle, especially of an automobile, with at least one display element, by which by transmitting light beams by the display element at least one value, one graphic, at least one letter or similar can be displayed and which can be adjusted in its display brightness. The display device also comprises a detection device with a control unit and at least one detecting element for detecting an ambient brightness of the surroundings of the display element. In this case the display brightness can be adjusted by the control unit depending on at least one signal characterizing the detected ambient brightness and transmitted from the detecting element to the control unit.

In order to achieve particularly low complexity and thus particularly low costs of the display device, with a second aspect it is provided that light beams transmitted by the display element are detected by the detecting element, wherein at least one evaluation signal characterizing the detected light beams is transmitted to the control unit by the detecting element. The display element is tested regarding its functionality depending on the evaluation signal by the control unit. Advantageous embodiments of the first aspect are to be considered as advantageous embodiments of the second aspect and vice-versa.

Within the scope of the proposed method for operating the display device, which is commonly also referred to as a combination instrument, the detecting element is thus both used for adjusting the display brightness, and thus for adapting the display brightness to the ambient brightness, and also for functional monitoring of the display element.

In order to test or monitor the display element regarding its functionality, the display element itself, especially at least an illumination element of the display element, is used as a light source, by which light beams are transmitted by the display element. The transmitted light beams are detected by the detecting element and characterized by the evaluation signal. Here it is possible to determine whether the display element is actually transmitting the light beams or not using the evaluation signal. In other words, detecting the light beams by the detecting element can also reveal that the display element is not transmitting or cannot transmit any light beams. This may occur, for example, if the display element is "frozen" in the dark phase during light and dark cycling.

Because of said dual use of the detecting element, additional detecting elements and the accompanying costs of wiring and installation space can be avoided.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
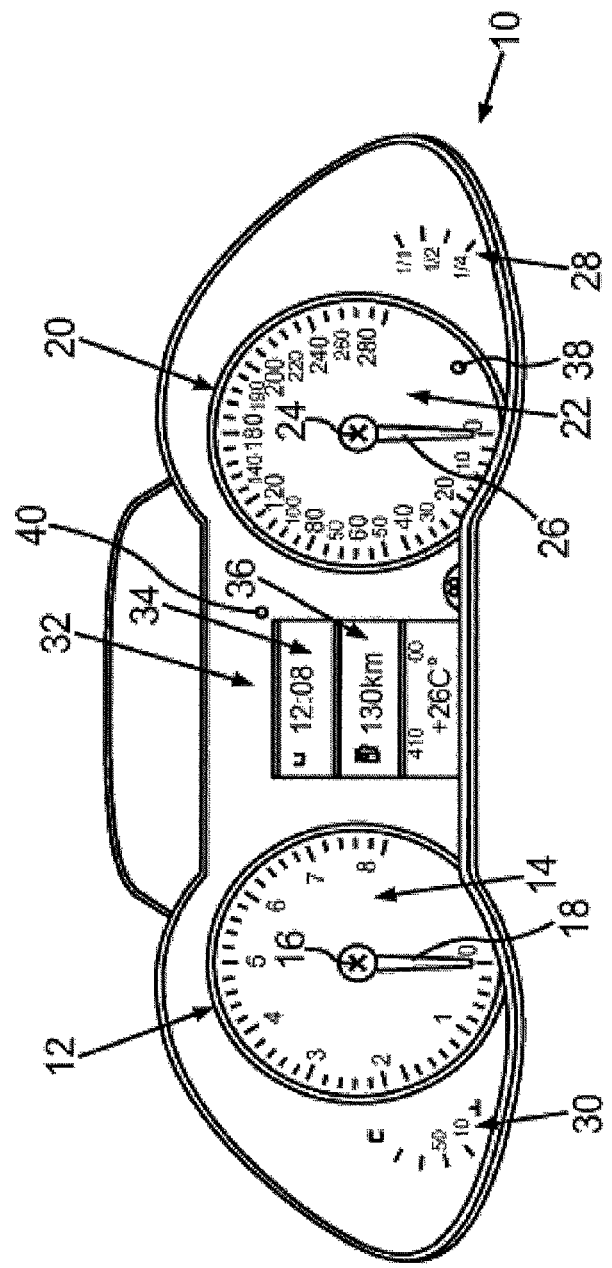
FIG. 1 shows a schematic front view of a display device of an automobile according to the prior art.

Reference will now be made in detail to the preferred embodiments of the present invention, examples of which are illustrated in the accompanying drawings, wherein like reference numerals refer to like elements throughout.

The display device 10 according to FIGS. 2 and 3 differs only in parts from the display device 10 according to FIG. 1, wherein only the differences are dealt with below. During this the same reference characters in the figures refer to the same and/or functionally equivalent elements.

Figure 2:
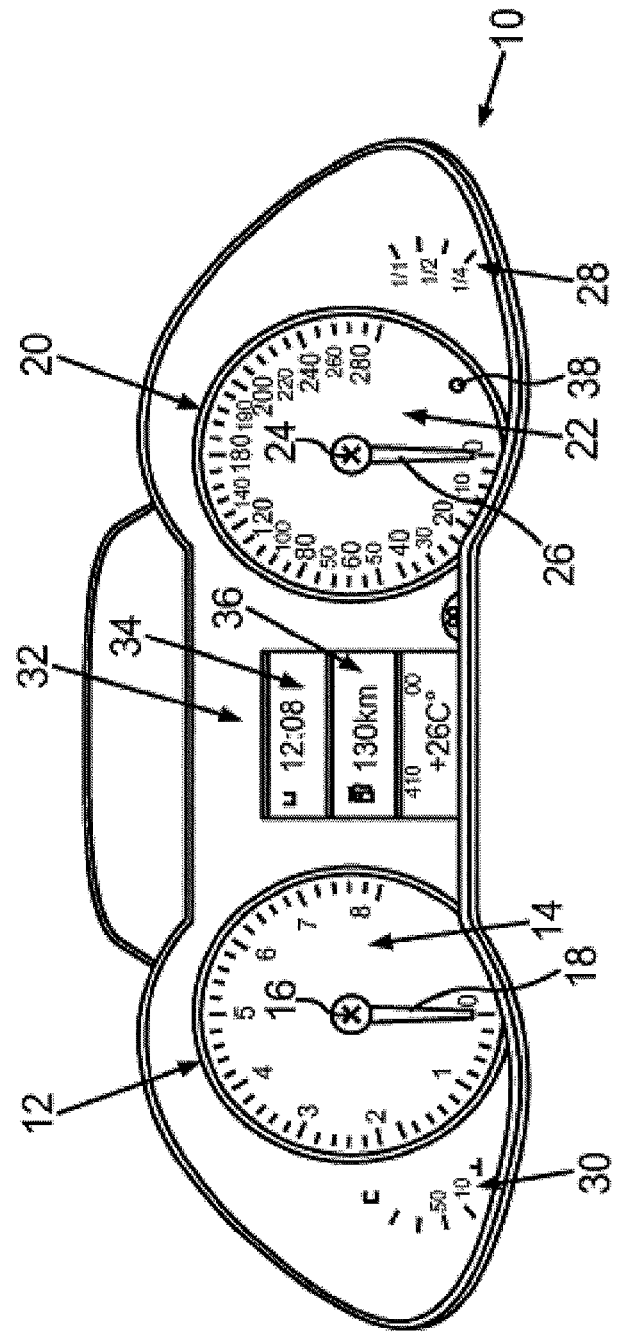
FIG. 2 shows a schematic front view of another embodiment of the display device, in which a detecting element of a detection device is used both for adjusting a display brightness of at least one display element of the display device and also for testing the display element regarding its functionality.

The display device 10 according to FIG. 2 differs from the display device 10 according to FIG. 1 in that the detecting element 38 is designed to detect transmitted light beams from at least one of the display elements 12, 20, 28, 30, 32 and to transmit at least one evaluation signal characterizing the detected light beams to the control unit. The display element 12, 20, 28, 30, 32 can be tested regarding its functionality depending on the evaluation signal by the control unit.

As can be seen in conjunction with FIG. 1, this enables the further additional detecting element 40 and the costs of installation space and wiring caused by the detecting element 40 to be dispensed with.

The detecting element 38, which for example is in the form of a phototransistor, is thus not only used to detect the ambient brightness and to adjust or vary the display brightness depending on the detected ambient brightness. The detecting element 38 is now also used, for example, to detect the light beams transmitted by the display element 32 in the form of a liquid crystal display screen and depending thereon to test the display element 32 (liquid crystal display screen) regarding its functionality.

Figure 3:
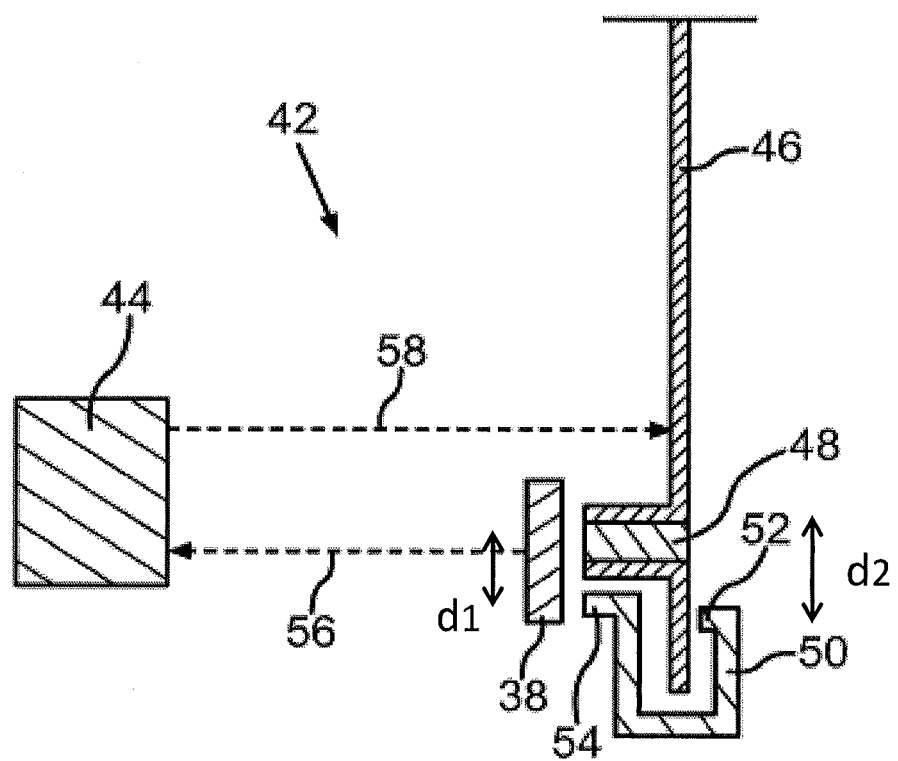
FIG. 3 shows a schematic sectional view of the display device according to FIG. 2.

The principle of operation of the detecting element 38 can be seen particularly well using FIG. 3. In FIG. 3 a detection device of the display device 10 can be seen, being designated by 42. In FIG. 3 the control unit of the detection device 42 can also be seen, being designated by 44. A diaphragm element 46 of the display device 10, being made of plastic, can also be seen in FIG. 3. The diaphragm element 46 comprises a through opening, which is disposed in alignment with the display element 32. This allows the display elements 32 to not be covered by the diaphragm element 46.

As can be seen from FIG. 3, the detection device 42 comprises a first optical fiber 48, via which light beams from the surroundings of the display device 10 are fed to the phototransistor (detecting element 38). This enables the detecting element 38 to detect the light beams from the surroundings via the first optical fiber 48.

Furthermore, the detection device 42 comprises a second optical fiber 50, whose first end 52 is oriented towards the display element 32, i.e. is disposed in alignment with the display element 32. A second end 54 of the second optical fiber 50 is disposed in alignment with the detecting element 38, so that the light beams transmitted by the display element are fed by the second optical fiber 50 to the detecting element 38 and as a result can be detected by the detecting element 38. By using the first optical fiber 48 and the second optical fiber 50, it is possible to detect the light beams from the surroundings and the light beams transmitted by the display element at respective points which are spaced apart by a certain distance, (e.g., a distance $d_2$). The distance $d_2$ may be relatively widely spaced apart than a distance (e.g., a distance $d_1$) between locations on the detecting element that the first optical fiber 48 and the second optical fiber 50 feed light beams to, because the respective light beams can be guided from the separately disposed points to the one detecting element.

A directional arrow 56 in FIG. 3 indicates a coupling of the detecting element 38 to the control unit 44, so that the evaluation signal can be transmitted from the detecting element 38 to the control unit 44. A directional arrow 58 indicates a coupling of the control unit 44 at least to the display element 32, by which the display element 32 can be adjusted, i.e. varied, in its display brightness by the control unit 44, and can be controlled to effect the light and dark cycling.

An entire display surface of the display element 32 on which values and/or texts and/or graphics are displayed is not used for testing the functionality of the display element 32 regarding it functionality. Rather, a sub region of the display surface is used, with which the first end 52 of the second optical fiber 50 is disposed in alignment.

In the sub region a so-called light and dark cycling of the display element 32 (liquid crystal display screen) is carried out. This means that in the sub region over a specifiable period of time the intensity of the light beams transmitted by the display element 32 in the sub region varies, i.e. within the specifiable period of time it is set to a high value over at least a first time span of the period of time and is set to a relatively low value, especially to zero, in a second time span of the specifiable period of time adjoining the first time span.

Thus during the first time span a so-called light phase occurs, whereas in the second time span a so-called dark phase of the sub region occurs. Said light and dark cycling is used to differentiate between the ambient brightness and the display brightness of the display element 32. Said light and dark cycling is passed via the second optical fiber 50 to the detecting element 38. The light and dark cycling results in corresponding modulation of the evaluation signal, which is transmitted from the detecting element 38 to the control unit 44. Filtering of the evaluation signal is carried out by the detecting element 38 or the control unit 44, wherein an at least substantially sinusoidal profile of the evaluation signal may result because of the light and dark cycling. In other words, the change of the intensity of the light beams transmitted by the display element 32 in the sub region caused by the light and dark cycling results in a so-called sinusoidal brightness signal.

If the functionality of the display element 32 deviates from its desired functionality, then for example such a light and dark cycling is not carried out, so that the evaluation signal also deviates from the sinusoidal target signal. If this is the case, then it can be concluded that a variation of the display brightness of the display element 32 and/or a variation of a value that can be displayed by the display element 32 cannot be carried out and/or a different value or a different graphic than the current time of day 34 and the range 36 can no longer be displayed by the display element 32. This is commonly referred to in the computer field as "freezing" or as "hanging".

The occurrence of such "freezing" of the display element 32 in the form of the liquid crystal display screen can be concluded if for example a sinusoidal evaluation signal is not detected by the detecting element 38, but an at least substantially constant evaluation signal is detected. Such a constant evaluation signal occurs for example if, despite suitable control of the display element 32 in order to effect the light and dark cycling, the light phase or the dark phase is persistently present and is not alternating with the suitably adjoining dark or light phase.

In this way a precise conclusion can be drawn regarding the functionality of the display element 32 without having to use an additional detecting element.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A display device of a motor vehicle, comprising:
   a display element to transmit light beams to display an informational item value; and
   a detection device that comprises:
      a detecting element to detect light beams transmitted by the display element, to detect an ambient brightness of surroundings of the display element and to transmit an evaluation signal characterizing the light beams detected and characterizing the ambient brightness detected;
      a first optical fiber to feed light beams from the surroundings of the display element through a through-hole of the display element to the detecting element;
      a second optical fiber to feed light beams transmitted by the display element to the detecting element; and
      a control unit to receive the evaluation signal, to adjust a display brightness of the display element depending on the evaluation signal and to test a functionality of the display element based on the evaluation signal,
   wherein
   the first optical fiber has one end oriented to face the detecting element, and
   the second optical fiber has a first end oriented to face the display element and a second end oriented to face the detecting element, the second end being offset from the one end of the first optical fiber.

2. The display device as claimed in claim 1, wherein
   the display element comprises a display surface through which light beams are transmitted, the light beams being transmitted to a sub region of the display surface, and
   the light beams are detected by the detecting element at the sub region of the display surface.

3. The display device as claimed in claim 2, wherein
   the sub region is formed by pixel image points of the display surface, and
   the pixel image points transmit the light beams that are detected by the detecting element.

4. The display device as claimed in claim 3, wherein
   the control unit varies an intensity of the light beams that are transmitted at the pixel image points of the display surface, and
   the intensity of the light beams is varied within a predetermined period of time.

5. The display device as claimed in claim 1, wherein
   the control unit varies an intensity of the light beams that are transmitted, and
   the intensity of the light beams are varied within a predetermined period of time.

6. The display device as claimed in claim 5, wherein
   the control unit reduces the intensity of the light beams to zero at least once within the predetermined period of time.

7. The display device as claimed in claim 5, wherein
the intensity of the light beams is varied between a dark phase and a light phase to differentiate between the ambient brightness and the light beams transmitted by the display element.

8. The display device as claimed in claim 1, wherein the detecting element is a phototransistor.

9. The display device as claimed in claim 1, wherein the display element is a liquid crystal display screen.

10. A motor vehicle comprising the display device as claimed in claim 1.

11. The motor vehicle as claimed in claim 10, wherein the display device is a combination instrument cluster.

12. The display device as claimed in claim 1, wherein the first optical fiber is provided in the through-hole of the display element.

13. A display device of a motor vehicle, comprising:
a display element to transmit light beams to display an informational item value; and
a detection device that comprises:
a detecting element to detect light beams transmitted by the display element, to detect an ambient brightness of surroundings of the display element and to transmit an evaluation signal characterizing the light beams detected and characterizing the ambient brightness detected;
a first optical fiber to feed light beams from the surroundings of the display element through a through-hole of the display element to the detecting element;
a second optical fiber to feed light beams transmitted by the display element to the detecting element; and
a control unit to receive the evaluation signal, to adjust a display brightness of the display element depending on the evaluation signal and to test a functionality of the display element based on the evaluation signal
wherein
the first optical fiber captures light beams at a first location on the display element,
the second optical fiber captures light beams at a second location on the display element, and
the first and second optical fibers feed light beams to the detecting element at respective locations on the detecting element that are closer together than the first and second locations on the display element.

14. The display device as claimed in claim 13, wherein
the second optical fiber has first and second ends,
the first end is oriented to be aligned with the display element, and
the second end is oriented to be aligned with the detecting element.

15. The display device as claimed in claim 13, wherein
the first optical fiber has one end oriented to face the detecting element, and
the second optical fiber has a first end oriented to face the display element and a second end oriented to face the detecting element, the second end being offset from the one end of the first optical fiber.

16. A method for operating a display device of a motor vehicle, comprising:
displaying an informational item value by transmitting light beams through a display element;
detecting an ambient brightness of surroundings of the display element using a detecting element of a detection device;
detecting light beams transmitted by the display element using the detecting element;
transmitting an evaluation signal from the detecting element, the evaluation signal characterizing the ambient brightness detected and characterizing the light beams detected;
using a first optical fiber to feed light beams from the surroundings of the display element through a through-hole of the display element to the detecting element;
using a second optical fiber to feed light beams transmitted by the display element to the detecting element;
receiving the evaluation signal at a control unit of the detection device;
adjusting, using the control unit, a display brightness of the display element depending on the evaluation signal; and
testing, using the control unit, a functionality of the display element based on the evaluation signal,
wherein
the first optical fiber has one end oriented to face the detecting element, and
the second optical fiber has a first end oriented to face the display element and a second end oriented to face the detecting element, the second end being offset from the one end of the first optical fiber.

* * * * *